Figure 1:
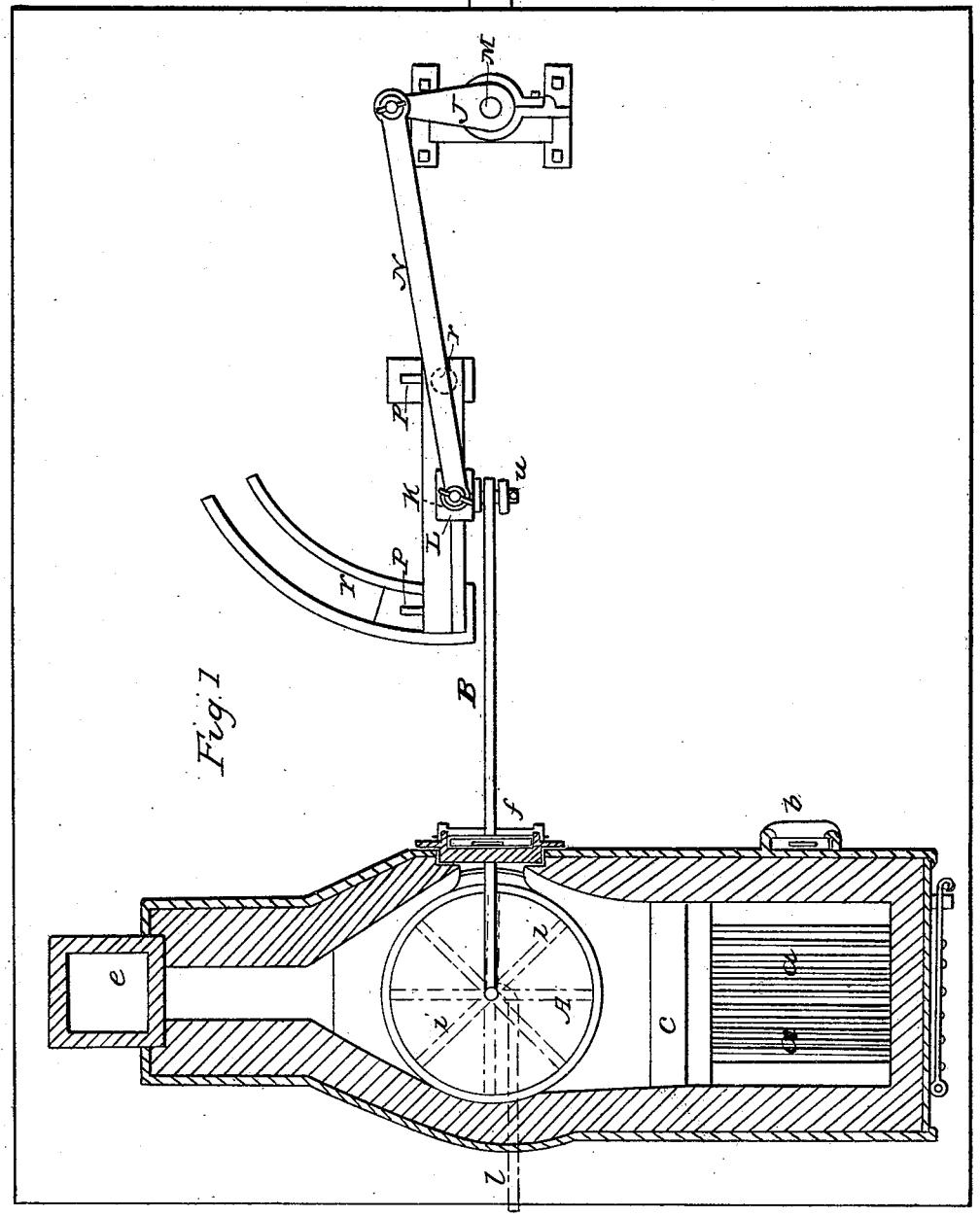

J. McCARTY.
Puddling Machine.

No. 9,303.

2 Sheets—Sheet 1.

Patented Oct. 5, 1852.

J. McCARTY.
Puddling Machine.
No. 9,303.
2 Sheets—Sheet 2.
Patented Oct. 5, 1852.
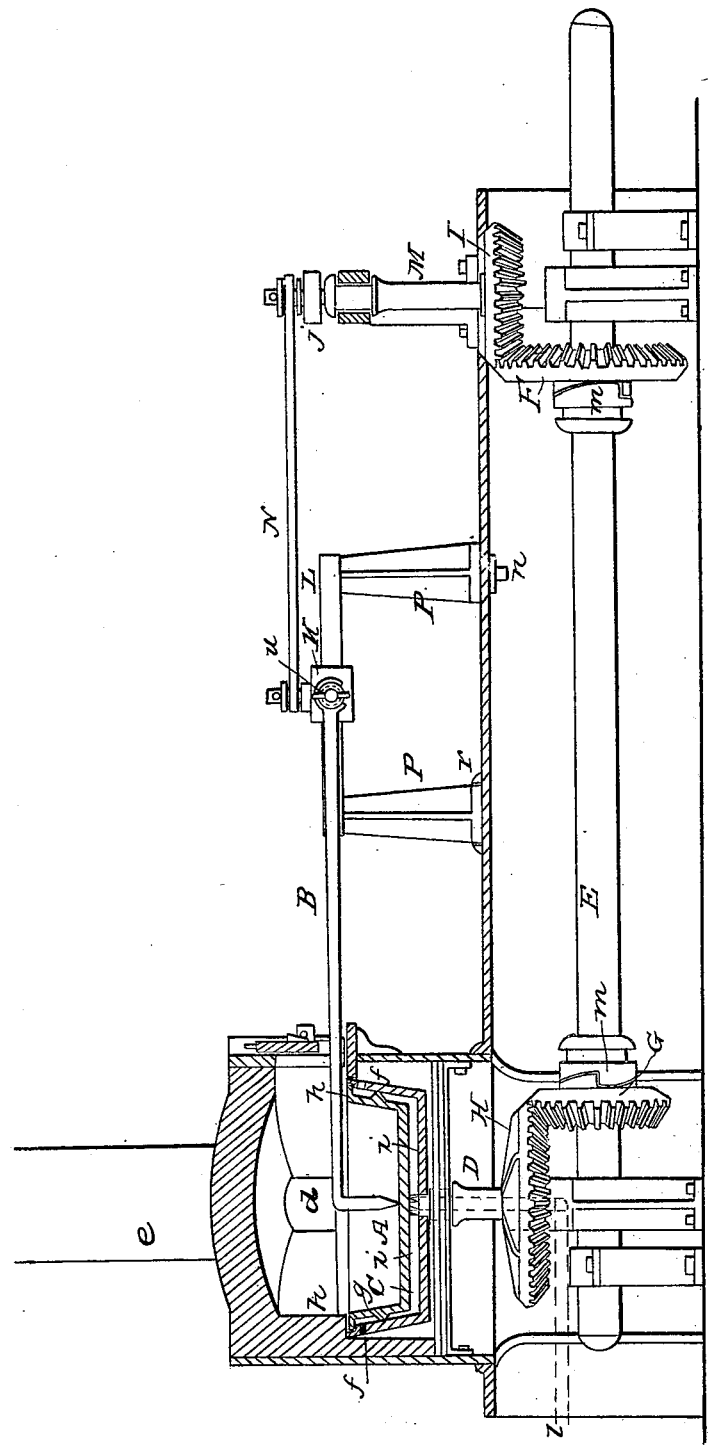

UNITED STATES PATENT OFFICE.

JAMES McCARTY, OF READING, PENNSYLVANIA.

IMPROVED APPARATUS FOR PUDDLING IRON, &c.

Specification forming part of Letters Patent No. 9,303, dated October 5, 1852.

*To all whom it may concern:*

Be it known that I, JAMES McCARTY, of Reading, in the county of Berks and State of Pennsylvania, have invented a new and useful Automatic Puddling-Furnace, of which the following is a full, clear, and exact description, reference being had to the accompanying drawings, which form part of this specification, and in which—

Figure 1 is a sectional horizontal view or plan of the furnace, and Fig. 2 a vertical section taken transversely through the same.

It is known that cast-iron, which is a compound of carbon and iron, does not possess the property of malleability. The object of puddling is to deprive cast-iron of its carbon, and thus render it malleable. This is effected by melting the cast-iron in the hearth or basin of a reverberatory furnace and stirring it continuously, so as to expose every portion of its mass to the oxidizing action of the air and flame, and to incorporate into it substances which are thrown into the basin, and which are rich in oxygen—such as native oxides of iron, forge-cinders, and so forth. This stirring of the metal has heretofore been performed by means of a hooked bar of iron, called a "rabble," worked by hand.

The object of my invention is to dispense with hand-labor in stirring the metal in the process of puddling; and it consists, first, in operating the rabble by means of machinery; second, in the combination of a moving basin to contain the metal with a rabble working automatically; third, in the arrangement of water-conduits and the puddling-basin in such manner that a stream of water is caused to run between the basin and a jacket or case surrounding the bottom and sides thereof to prevent the basin from being overheated.

The reverberatory furnace, as represented in the drawings, is, with the exception of the basin or hearth, constructed and arranged in the usual manner, *a* being the loose fire-bars of the grate; *b*, the charging or stoking door for the coal; *c*, the fire-bridge, made hollow or otherwise, as desired; A, the basin for the reception of the metal; *d*, the throat or flue to the stack *e* of the furnace; *f*, the usual sliding door for charging in the metal and removing the "puddle-balls," made with the usual hole at the bottom for the insertion and withdrawal of the rabble, &c. The flame as it passes from the grate to the stack is thrown downward, as usual, by the curvature of the roof upon the metal in the basin A. This basin, instead of being stationary, as usual, is made to rotate. It is of any required diameter and depth, is formed of cast-iron, and is lined or coated in the ordinary way to protect it from the destructive action of the flame. Its sides are strengthened by a rib, *g*, round its middle, and by a flange, *h*, at its top. This basin is supported in a cooler or water-vessel, C, whose bottom is constructed with radial ribs *i*, for the bottom of the basin to rest on. The internal diameter and depth of the cooler are such as to leave a space of two inches (more or less) between it and the sides and bottom of the basin, in which space water is caused to circulate to keep the basin A from overheating, the water being introduced in any appropriate way—say through the shaft D, which supports and rotates the cooler C. Water thus entering the cooler through the shaft D form a conduit, *l*, passes beneath the bottom of the basin and rises at its sides through notches in the rib *g* to apertures *s*, near the top of the cooler, from which it escapes. The shaft D, on which the basin A and cooler C are mounted, is caused to rotate by means of a bevel-wheel, H, secured to it, which gears into a pinion, G, on the main driving-shaft E. This driving-shaft also carries a bevel-wheel, F, that gears into a pinion, I, which turns an upright shaft, M, that carries a crank, J, on its upper end. The crank J is connected by a rod, N, with a sliding carriage, K, to which it communicates an alternating movement that, through a wrist-pin, *u*, is imparted to a rabble, B, connected by its outer hooked extremity therewith. The carriage K is guided in its reciprocating motion by a slide, L, supported on a frame, P, which turns at one end on a pivot, *n*, and at its opposite end moves along a curved way, *r*, so that when the rabble is not required to be worked by the crank the frame and carriage may be turned out of the way. When the rabble is at work, the frame P is fixed or set in the position represented in the drawings; or it may be moved to either side of this position for the purpose of making the rabble cross the puddling-bottom at different angles and stir the metal over different parts of it. This is especially advantageous when using the rabble in connection with a stationary basin or bottom. The end of the rabble which enters the basin, may be made of suitable form for stirring up the metal; but the opposite end should be so constructed that it can be readily connected and disconnected with the wrist-pin of the carriage in order that when one rabble becomes unduly heated it may be removed and replaced by another. The basin, being charged with the metal, (and the latter brought to a melting heat, or thereabout,) is made to revolve, and simultaneously with this movement of the basin the rabble B is put into action, by which combined motions the whole mass in the basin will be effectually and uniformly stirred, the stroke of the rabble being the diameter of the basin, or nearly so. Previous to this operation of stirring the metal, and before the rabble is inserted, the basin alone may be made to revolve, for the purpose of more uniformly heating the metal to fusion by varying the surfaces of exposure to the strongest heat. In stirring up the mass, if it be required to agitate one portion more than another, the greatest facility for doing this is afforded by stopping the action of the basin and continuing that of the rabble. The combined movements of the basin and rabble will more thoroughly stir the mass than could possibly be accomplished by hand, and thus the most laborious process in the manufacture of iron is rendered easy, while the cost of the product is considerably reduced. If it be deemed advisable, the basin may have an oscillating movement imparted to it by means of a crank and connecting-rod, or otherwise; and, instead of moving the rabble by connecting it with the wrist of the sliding carriage it may be connected directly with the wrist of the crank. When the process of puddling has advanced to the stage in which the cast metal has become so far decarbonized that it has lost its fluidity and has become granular, so that the particles will weld together, the automatic rabble must be withdrawn and the charge divided by hand into suitable quantities and worked into puddle-balls in the usual manner.

During the operation of balling the metal the movement of the basin, as well as the rabble, may be suspended, although it will often be advisable to turn the basin partially, that the workman may reach the metal more conveniently.

Having thus described my automatic puddling apparatus, what I claim as new, and desire to secure by Letters Patent, is—

1. The combination of an automatic rabble with a revolving or moving basin, arranged and operated substantially as herein set forth, or with a stationary basin or bottom, whereby much manual labor is dispensed with for stirring the iron in the process of puddling.

2. The arrangement of the hollow shaft D, cooler C, and moving basin in such manner that a stream of water can be kept circulating round the bottom and sides of the latter to prevent it from being overheated, substantially as herein described.

3. The combination of the crank and swinging guides or their equivalents, which enables the operator to make the rabble stir over different parts of the bottom and at different angles to the side of the furnace, and also to remove it out of the way when necessary.

In testimony whereof I have hereunto subscribed my name.

JAMES McCARTY.

Witnesses:
DANIEL J. WERNER,
JOHN HETRICK.